(12) United States Patent
Wolff et al.

(10) Patent No.: US 11,126,666 B2
(45) Date of Patent: Sep. 21, 2021

(54) TEMPORAL CLUSTERING OF NON-STATIONARY DATA

(71) Applicant: VERIZON MEDIA INC., New York, NY (US)

(72) Inventors: Ran Wolff, Haifa (IL); Nadav Yutal, Haifa (IL)

(73) Assignee: VERIZON MEDIA INC., New York, NY (US)

( * ) Notice: Subject to any disclaimer, the term of this patent is extended or adjusted under 35 U.S.C. 154(b) by 163 days.

(21) Appl. No.: 16/358,942

(22) Filed: Mar. 20, 2019

(65) Prior Publication Data

US 2020/0301967 A1    Sep. 24, 2020

(51) Int. Cl.
| | | |
|---|---|---|
| *G06F 16/906* | (2019.01) | |
| *G06F 16/28* | (2019.01) | |
| *G06F 17/14* | (2006.01) | |

(52) U.S. Cl.
CPC .......... *G06F 16/906* (2019.01); *G06F 16/285* (2019.01); *G06F 17/142* (2013.01)

(58) Field of Classification Search
CPC ............................. G06F 16/906; G06F 16/285
See application file for complete search history.

(56) References Cited

U.S. PATENT DOCUMENTS

| | | | | |
|---|---|---|---|---|
| 2003/0212702 | A1* | 11/2003 | Campos | G06N 7/005 |
| 2018/0365298 | A1* | 12/2018 | Poghosyan | G06F 17/18 |
| 2020/0275895 | A1* | 9/2020 | Barachant | G06N 20/00 |
| 2020/0287923 | A1* | 9/2020 | Raghavendra | G06N 20/00 |

OTHER PUBLICATIONS

Roelofsen, P. (2018). Time series clustering. Master's Essay. Vrije Universiteit, Amsterdam, Netherlands (Year: 2018).*

Taylor, C. M., & Salhi, A. (2017). On partitioning multivariate self-affine time series. IEEE Transactions on Evolutionary Computation, 21(6), 845-862. (Year: 2017).*

* cited by examiner

*Primary Examiner* — William Spieler
(74) *Attorney, Agent, or Firm* — James J. DeCarlo; Greenberg Traurig, LLP (57) ABSTRACT

Techniques for clustering non-stationary data are disclosed. In embodiments, a method is disclosed comprising initializing a plurality of functional centroids; partitioning a non-stationary data set, using the functional centroids, into partitions, the number of partitions being equal to the number of functional centroids; generating a set of fitted functional centroids for each of the partitions; replacing at least one of the functional centroids with a corresponding fitted functional centroid if a computed energy of the corresponding fitted functional centroid is less than an energy of the at least one functional centroid; computing a summation of the energies associated with each of the functional centroids; and outputting the functional centroids upon determining that a termination condition is met.

23 Claims, 8 Drawing Sheets

TEMPORAL CLUSTERING OF NON-STATIONARY DATA

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

The disclosed embodiments relate to the field of unsupervised learning and, in particular, to methods and devices for more accurately clustering non-stationary data.

Clustering of data is commonly used in data science and other applications to discover groupings of data that are otherwise unlabeled. The objective of clustering is to describe large and diverse data as an output of a small number of stochastic sources. When successful, clustering provides important insights into the nature of the process. For instance, clustering can show that correlations which seem to occur in a data set are actually a juxtaposition of two or more different correlations—a phenomenon known as "Simpson's paradox" in behavioral data analysis.

There are currently numerous techniques for analyzing stationary data, such as k-means clustering. However, in many applications time plays an important part in clustering if the process is measurement over a period. Stream mining algorithms treat time as a computational restriction which forces online processing of the data. In contrast, spatiotemporal clustering such as k-means clustering focus on the movement of objects in space and therefore treat time as a privileged dimension of the data.

Various clustering approaches still assume the sources of the data are stationary. That is, each source produces the same sequence over and over with differences due only to noise and the timing of specific sample relative to the beginning of the measurement period. Some approaches utilize a temporal model such as Kalman filter or autoregressive-moving-average (ARMA) model that projects temporal data to a measurement space. However, these approaches assume a single stochastic source.

The approaches above are unable to efficiently and accurately cluster complex non-stationary data that appears in many modern systems.

BRIEF SUMMARY

The disclosed embodiments remedy these and other technical deficiencies by providing a function clustering technique that is capable of quickly and accurately identifying one or more functional centroids for a supplied non-stationary data set.

The disclosed embodiments describe the clustering of temporal, non-stationary, data. Rather than clustering data around points in the measurement space as employed by existing approaches, the disclosed embodiments cluster a non-stationary data set around functions from the time to the measurement space. The identified functions can describe a linear or a polynomial trend, or they can be cyclic. Additionally, the disclosed embodiments describe techniques for predicting the future distribution of the data. While traditional (stationary) clustering algorithms are mostly judged by their descriptive power, the disclosed embodiments temporal clustering improves upon these techniques via predictive properties.

To accomplish these and other goals, the claims describe methods for clustering a non-stationary data set. One disclosed method comprises initializing a plurality of functional centroids. A non-stationary data set is then partitioned using the functional centroids into partitions wherein the number of partitions equal to the number of functional centroids. The method then generates a set of fitted functional centroids for each of the partitions and replaces at least one of the functional centroids with a corresponding fitted functional centroid if a computed energy of the corresponding fitted functional centroid is less than an energy of the at least one functional centroid. Finally, the method computes a summation of the energies associated with each of the functional centroids and outputs the functional centroids upon determining that a termination condition is met. Computer-readable media and apparatuses implementing these and other methods are additionally disclosed in more detail herein.

DETAILED DESCRIPTION

Figure 1:
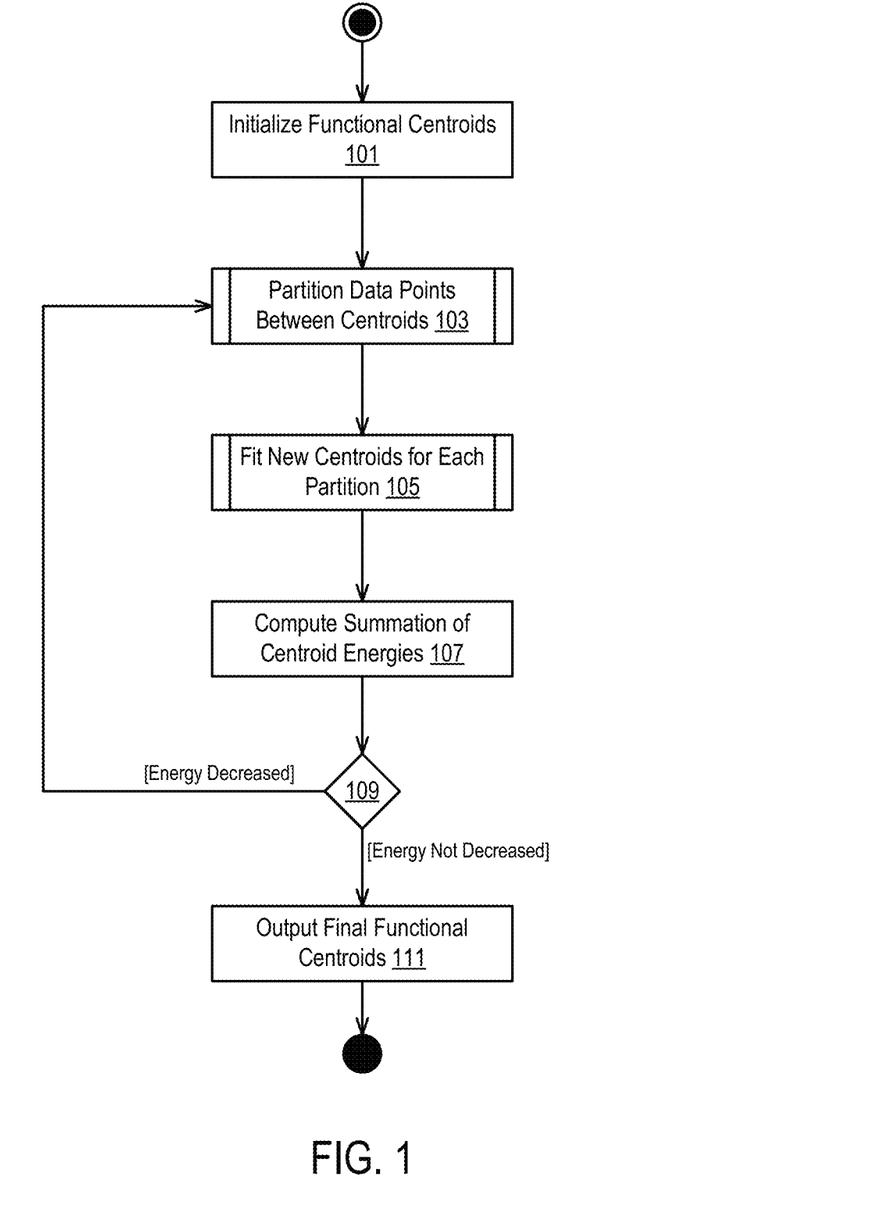
FIG. 1 is a flow diagram illustrating a method for generating functional centroids according to some embodiments of the disclosure.

FIG. 1 is a flow diagram illustrating a method for generating functional centroids according to some embodiments of the disclosure.

In step 101, the method initializes one or more functional centroids.

In one embodiment, a functional centroid comprises a function taking a timestamp (or other time representation) as an input and outputting a feature vector. The number of functional centroids initialized in step 101 can be adjusted based on the underlying data set the method (100) is applied to. Various approaches to initializing a set of functional centroids are described herein. However, other approaches may be taken based on the type of data being analyzed.

In each of the examples described, an input non-stationary data set is partitioned into a series of partitions. For instance, the method can partition the non-stationary data set into multiple time segments. The duration of these time segments can be set according to the needs of the data set or the processing capabilities of the computer.

In a first embodiment, the method selects a random point in each of the partitions. Next, a function is fit using the randomly selected points. This process can be repeated multiple times to generate multiple functional centroids. This process is illustrated in the following pseudo code:

TABLE 1

Given T, $\mathbb{F}$, k
C ← {{$c_1$}, ... {$c_k$}: $c_i$~U[T]
F ← {$f_1$, ... $f_k$: $f_i$ = Fit({$c_i$}, $\mathbb{F}$ )
return F where T represents the timestamped data set, $\mathbb{F}$ represents a function space, k represents the number of centroids desired, C represents a set of randomly selected points ($c_i$ ... $c_k$), U[T] represents the partitioned timestamped data set (T), Fit represents a fitting function, $f_1$ ... $f_k$ represent functions in function space $\mathbb{F}$, and F represents a list of k functional centroids.

In a second embodiment, multiple points are selected for each partition as illustrated in the following pseudo code:

TABLE 2

Given T, $\mathbb{F}$, k, d
C ← {$C_1$ ... $C_k$: $C_i$ = {$c_i^1$}, ... $c_i^d$} ∧ $c_i^j$ ~ U[T]
F ← {$f_1$, ... $f_k$: $f_i$ = Fit($C_i$, $\mathbb{F}$ )
return F where Ci represents a set of randomly chosen points (one per partition), d represents the number of partitions, and j represents a given partition between 1 and d (remaining variables are described in the description of Table 1.

In a third embodiment, only one point is selected in each partition, however k-init++ initialization is used to select those points instead of uniform selection.

In step 103, the method partitions data points between the function centroids identified in step 101. Further discussion of the operation of step 103 is provided in FIG. 2, the disclosure of which is not repeated herein.

In general, the method iterates through each data point in the input non-stationary data set. For each point, the method calculates the distance between the point and the output of each of the functional centroids: $s-f_i(t)$, where s is the value of the non-stationary data set point at time t and $f_i$ is functional centroid i. The method then selects the minimum value of $|s-f_i(t)|$ for each of the functional centroid and assigns the point (s, t) to a centroid set ($T_c$) for that centroid c.

In step 105, the method then fits new centroids for each partition generated in step 103. Further discussion of the operation of step 105 is provided in FIG. 3, the disclosure of which is not repeated herein.

In general, the method selects each centroid set and fits a function based on the data points in that set. The method then determines if the energy of the fitted function is lower than the energy of the current centroid function. If so, the centroid function is set to the fitted function and, if not, the fitted function is discarded. The energy of the chosen function is then added to a set of energies for each centroid function. The "energy" of a centroid function is described more fully in the description of step 107.

In step 107, the method sums the centroid energies stored in step 105. As described in step 105, the energy of a function can be represented as follows:

$$E_f(s) = \sum_{\langle s,t \rangle \subset S} |s - f(t)| \qquad \text{EQUATION 1}$$

where ⟨s, t⟩ is a data point (s) at time (t) within a non-stationary data set (S) and $f$ is a centroid function. As illustrated in Equation 1, an ideal centroid function would result in an energy Ef(s) of zero. In that scenario, the centroid function perfectly describes all points exactly. In some embodiments, the value of |s−(t)| may be weighted to account for outlying data points. For example, if n−1 points of n data points match exactly and one data point is significantly off, the method may weigh the data points to avoid such an outlier from skewing the energy of the centroid function.

In step 109, the method determines if the summed energies calculated in step 107 result in a net energy decrease. If so, the method continues to execute steps 103, 105, 107, and 109 until those steps no longer result in an energy decrease. In alternative embodiments, the method may execute steps 103, 105, 107, and 109 a preset number of times before terminating (to avoid infinite loops).

In step 111, the method outputs the final function centroids. In some embodiments, the functional centroid may comprise polynomial expressions. In this embodiment, the method outputs coefficients and powers of the expression. In other embodiments, the method may output the function itself. In either event, the functional centroids can be provided to downstream software application for further applications, some of which are described herein.

Figure 2:
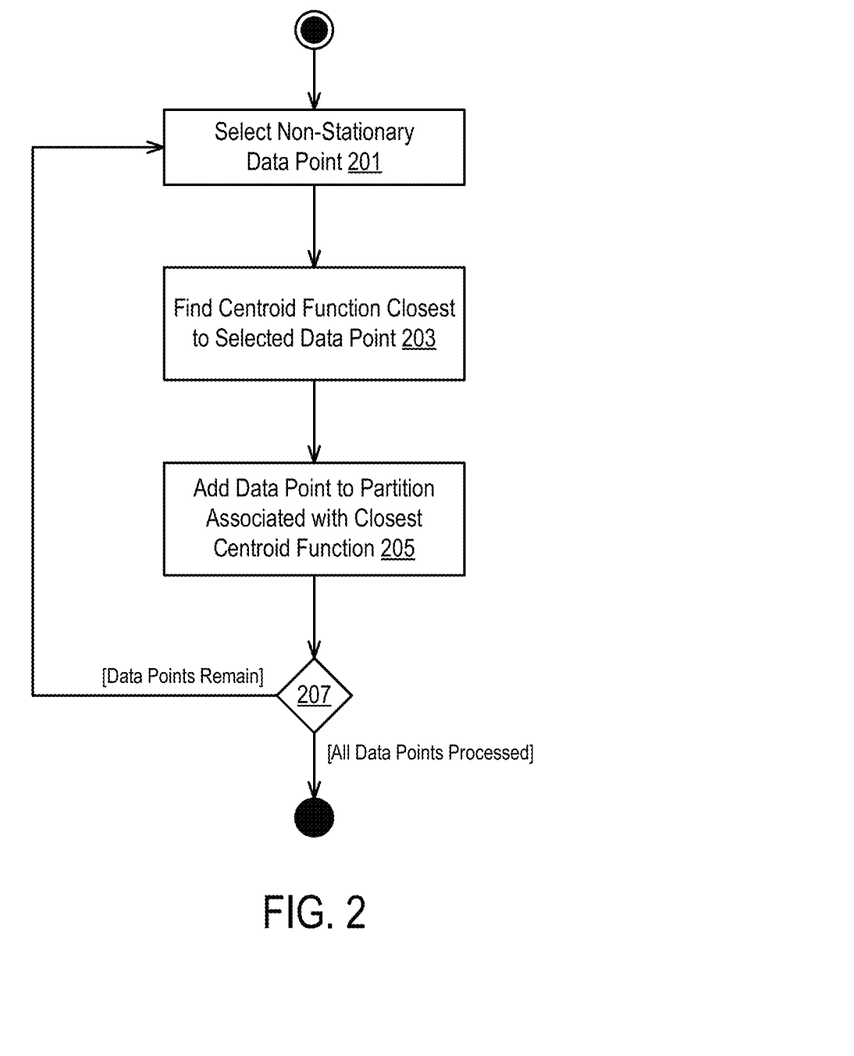
FIG. 2 is a flow diagram illustrating a method of partitioning data points between functional centroids according to some embodiments of the disclosure.

FIG. 2 is a flow diagram illustrating a method of partitioning data points between functional centroids according to some embodiments of the disclosure.

In step 201, the method selects a non-stationary data point.

Figure 4:
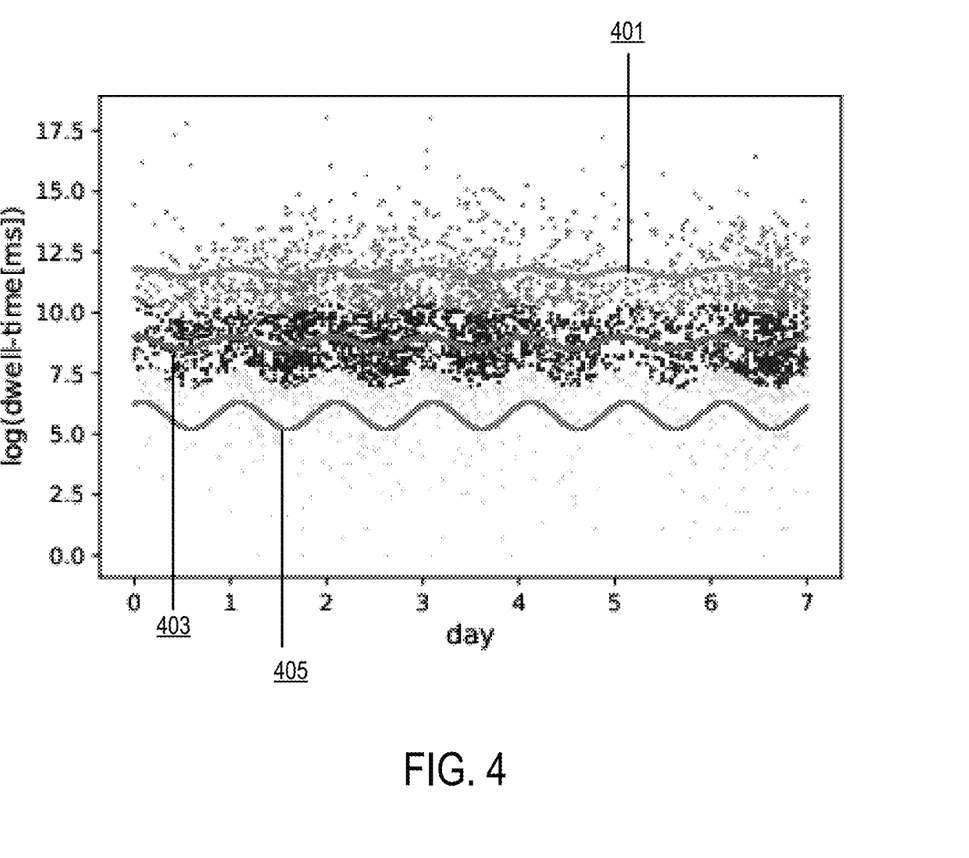
FIG. 4 is a graph illustrating a non-stationary data set and multiple functional centroids generating using the methods described herein according to some embodiments of the disclosure.

In the illustrated embodiment, a non-stationary data set comprises a set of points ⟨ s, t ⟩ where t represents a time and s represents a corresponding value at time t. One example of a non-stationary data set (depicted in FIG. 4) is dwell time of a web application over time. In this example, the value of s corresponds to a measure of time (e.g., 3 seconds) while the value of t corresponds to a timestamp that the dwell time is collected. Each data point in the non-stationary data set independently measures a single interaction of one of a large number of users with a single email message. The non-stationary data can be sampled over consecutive days (e.g., seven days as illustrated in FIG. 4). As can be seen in FIG. 4, the range of measured dwell time starts at one millisecond and goes all the way to $e^{17.5}$ milliseconds, or about 11 hours. A very short dwell time is typical of inbox cleanup, longer dwell time indicates reading the message and, sometimes, replying to it. Dwell time might be even longer if the user interacts with other web sites, or with human services, while reading the message (e.g., if the user synchronizes a hotel while looking at a trip itinerary). The longest dwell times may be users neglecting to close the browser window containing the email (i.e., they are outliers). Analyzing the data with temporal-clustering, as will be explained herein, reveals three different temporal behaviors (401, 403, 405) that can be represented as functional centroids. All three follow a daily cycle. The strongest cycle is that of short dwell time (405) with a mean between twenty and five hundred milliseconds. If we accept that this kind of activity indicates inbox cleaning then we learn that this activity is more dominant around 2 PM EST based on the functional centroid (405) identified using the methods described herein. Such insights, if validated by other means, can lead to further product ideas and improve downstream software applications.

As illustrated in FIG. 4, the set of points ⟨s, t⟩ are not exclusive. Various values of s may exist for any given t. Continuing the example, there are potentially a large range of values of s at any given time t. In the illustrated embodiment, each point is selected regardless of its values for s or t.

In step 203, the method finds a centroid function closest to the data point selected in step 201.

As described in connection with FIG. 1, during operation the method in FIG. 2 is provided with a set of functional centroids. These functional centroids comprise functions that take, as an input, a time and output a data point in the non-stationary data set. To find the functional centroid that is closest to a given point, the method in step 203 evaluates each value $(s_1, s_2, \ldots s_k)$ for each centroid function $(f_1, f_2, \ldots f_k)$. Then, for each value $(s_1, s_2, \ldots s_k)$, the method computes the distance between the actual point selected in 201 (s) and the results of the centroid functions ($|s-s_1|$, $|s-s_2| \ldots |s-s_k|$). The minimum value (argmin) of this set is chosen as the closest functional centroid. In this manner, the method identifies the centroid function that most closely matches the partitioned data.

In step 205, the method adds the data point selected in step 201 to a partition associated with the centroid function selected in step 203.

In one embodiment, prior to executing step 201, the method initializes a set of partitions $(T_1, T_2, \ldots T_c)$ to null sets, where c represents a centroid function. After identifying the closest centroid function, the method adds the data point from step 201 into the set (e.g., the union of ⟨s, t⟩ and $T_c$). The resulting set represents the partitioning of non-stationary data by centroid function.

In step 207, the method determines if all data points in the non-stationary data set have been analyzed. If not, the method continues to re-execute steps 201, 203, and 205 until all points have been assigned to a partition. Once all points have been processed, the method ends.

Figure 3:
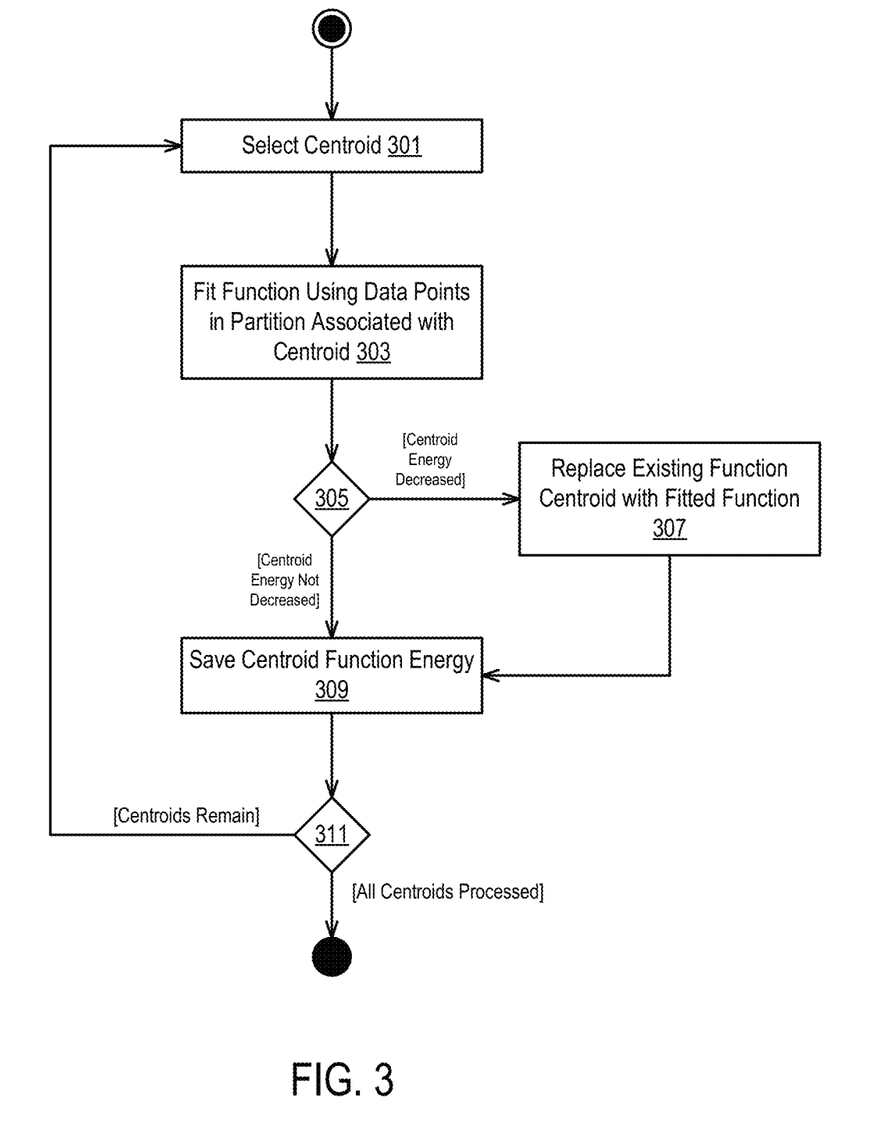
FIG. 3 is a flow diagram illustrating a method for fitting new centroids for a partitioned data set according to some embodiments of the disclosure.

FIG. 3 is a flow diagram illustrating a method for fitting new centroids for a partitioned data set according to some embodiments of the disclosure.

In step 301, the method selects a centroid.

In the illustrated embodiment, selecting a centroid comprises selecting partition generated in FIG. 2. That is, in step 301, the method selects a set of non-stationary data points partitioned based on the minimum distances to other centroid functions.

In step 303, the method fits a function using the data points in the partition associated with the centroid.

In the illustrated embodiment, fitting a function refers to identifying a function that most closely generates the data points used to fit the function. In the illustrated embodiment, various function fitting techniques can be used. For example, in a first embodiment, the method may utilize polynomial function fitting to identify a function fitting the partition data points. In some embodiments, the polynomial degree may be three or may be adjusted as needed. As a second example, the method may utilize single cosine fitting. In some embodiments, when using single cosine fitting the bias, frequency, and phase of the cosine may be optimized prior to fitting. For example, the frequency may employ L2-regularization to improve prediction of the fitting. As a third example, a nonequispaced fast Fourier transform (NFFT) may be used. In this example, a subset of the frequencies may be selected for fitting (e.g., eight of 256 frequencies).

Although the previous example illustrates various alternatives for functional fitting, other techniques may be used. In general, each technique requires a range of meta parameters. Additionally, given a dataset and absent knowledge of the temporal pattern of the data, the fitting algorithm itself should be treated as a meta-parameter. Moreover, in periodic data, the period is a meta-parameter. Last, the number of centroids is a meta-parameter. In some embodiments, the meta-parameters are selected by optimizing the predictive energy of the resulting centroids. In some embodiments, the number of centroids is excluded from this optimization since the energy of a solution decreases ad the number of centroids increases. However, the disclosed embodiments can only improve with respect to k-means if it finds another trend which can be predicted from the data. Therefore, in some embodiments a number of centroids is selected which minimizes the energy of the disclosed embodiments when compared to the energy of traditional clustering techniques such as k-means clustering. In some embodiments, parameter tuning is conducted on a separate period of the data than the one later used in experimentation.

In step 305, the method determines if the energy of the fitted function is less than the energy of the previous function.

As described above, the energy of a function is computed by summing the distances between an output value of the function and the expected value. In the illustrated embodiment, the existing energy prior to fitting the function in step 303 is cached. In step 305, the method computes the energy for the fitted function. In the illustrated embodiment, this step entails summing the distances between the output of the fitted function and the known data points in the active partition. In step 305, the method compares the two values (cached and computed). If the computed value is less than the cached value, the energy has decreased and the fitted function is a better approximation of the partition; thus, the method executes step 307.

In step 307, the method has detected that the fitted function better fits the centroid partition (due to the decrease in functional energy). In this case, the method replaces the current function for the partition with the fitted function. Alternatively, if the method detects that the energy change is nil, or if the fitted function increases the energy of the candidate function, the method discards the fitted function.

In step 309, the method saves the centroid function energy. In some embodiments, step 309 may be optional. As described previously in connection with FIG. 1, individual function energies are utilized (summed) to determine when the terminate the clustering procedure.

In step 311, the method determines if any centroids/partitions remain to be processed. If so, the method repeats steps 301, 303, 305, 307, 309, and 311 for each remaining partition/centroid. If not, the method ends.

Figure 5A:
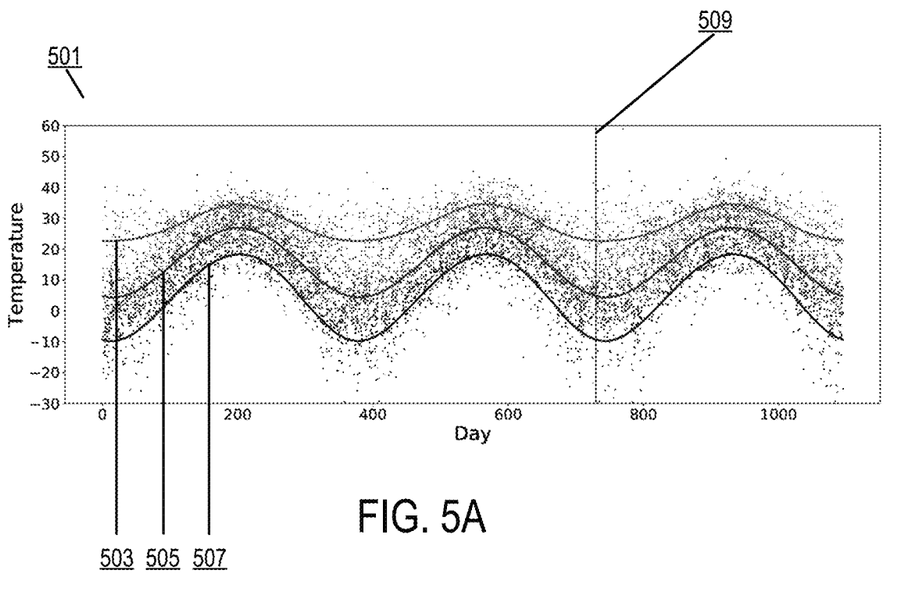
FIG. 5A is a graph illustrating a non-stationary data set and multiple functional centroids generating using the methods described herein according to some embodiments of the disclosure.
Figure 5B:
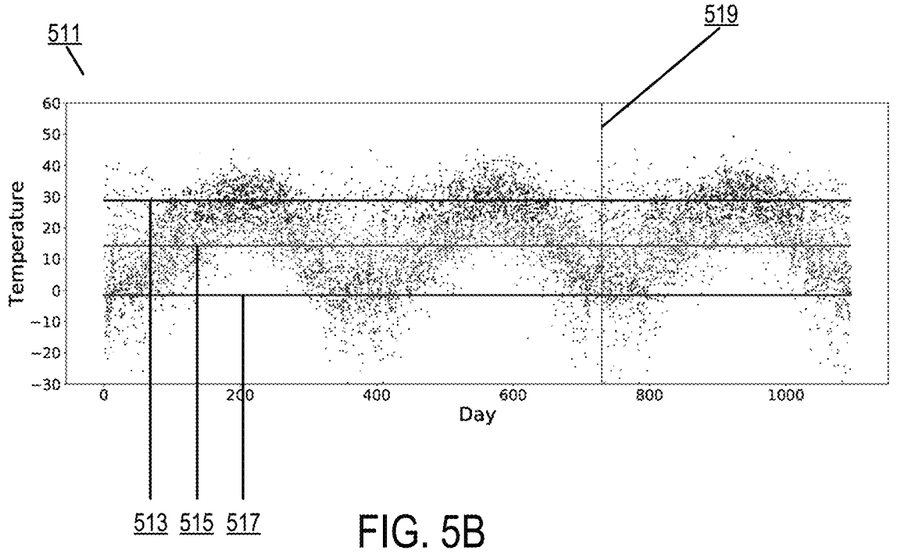
FIG. 5B is a graph illustrating a non-stationary data set and multiple non-functional centroids generating using pre-existing methods.

FIG. 5A is a graph illustrating a non-stationary data set and multiple functional centroids generating using the methods described herein according to some embodiments of the disclosure. FIG. 5B is a graph illustrating a non-stationary data set and multiple non-functional centroids generating using pre-existing methods.

As illustrated, a non-stationary data set representing weather data is graphically displayed as graphs 501 and 511.

In both FIGS. 5A and 5B, the weather data is plotted as temperature given a day and the underlying data is the same. In both graphs, the data is segmented into a training period and prediction period at point (509, 519). That is, data to the left of point (509, 519) comprises training data and data to the right of point (509, 519) comprises prediction data.

In the illustrated embodiment, the first graph 501 illustrates three functional centroids (503, 505, 507) using the methods disclosed herein. The second graph 511 illustrates three k-means centroids (513, 515, 517) generated using traditional k-means clustering.

In the illustrated embodiment, the energy of the data in the time units appearing after point (509, 519) are measured with respect to the functional centroids (503, 507, 509) and the k-means centroids (513, 517, 519). In the illustrated embodiment, the energy for the function centroid clusters (FIG. 5A) is approximately 51 million and that of the traditional k-means centroids (FIG. 5B) is about 62 million. Hence, the improvement of function clustering is approximately $^{51}/_{62}$, or 82%. In other words, the disclosed embodiments are able to explain 18% of the energy of future points by the temporal trends in the data when compared with existing clustering techniques such as k-means clustering.

Figure 5C:
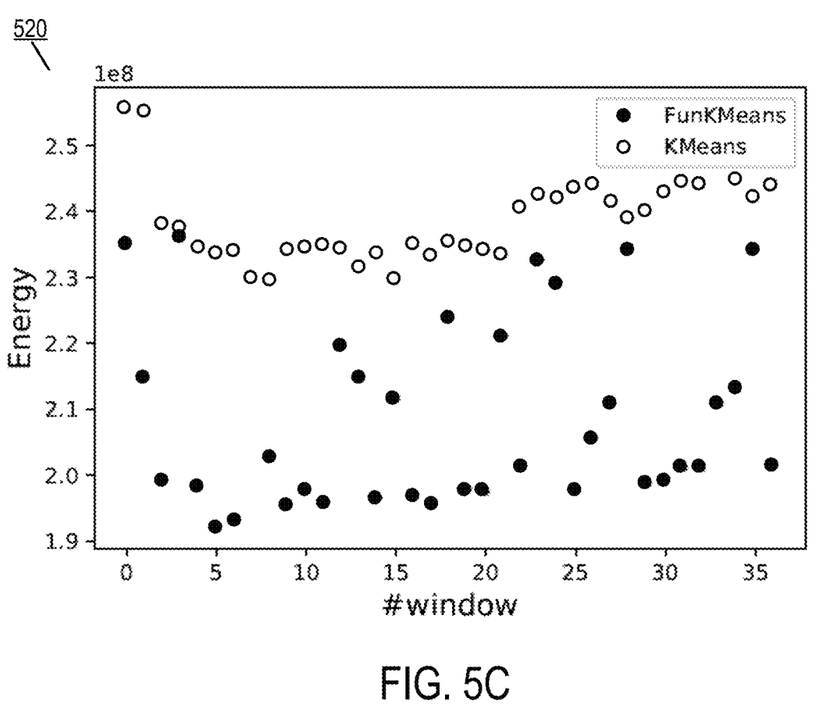
FIG. 5C is a graph illustrating the energy of the solutions computed by traditional k-means clustering and by the disclosed embodiments in various tests.

FIG. 5C is a graph illustrating the energy of the solutions computed by traditional k-means clustering and by the disclosed embodiments in various tests. In the illustrated embodiment, the claimed clustering method (FunKMeans) is compared with traditional k-means (KMeans). The illustrated graph 520 illustrates the result when comparing the algorithms over multiple windows of training data (x-axis) and plots the energy (y-axis for each window). As can be seen, while the performance of the disclosed clustering methods varies in this experiment, it is consistently better than that of traditional k-means.

Additionally, the disclosed embodiments were test on various datasets:

TABLE 3

| Name | Instances | Features | Distinct Timestamps |
|---|---|---|---|
| Weather | 140,000 | 3 | 2,555 |
| Smoking | 876 | 4 | 16 |
| Synthetic | 200,000 | 1 | 100,000 |
| Search | 250,000 | 1 | 237,000 |
| NJ Transit | 1,000,000 | 1 | 150,00 |

In these datasets, Weather contains the daily summary of the minimum and maximum temperatures and the precipitation in thousands of ground stations provided by the U.S. Historical Climatology Network (USHCN). The Smoking data set contains four categories of smoking habits over several years (controlling for the state variable) provided by the Centers for Disease Control and Prevention (CDC). The NJ Transit data set comprises delay information from the New Jersey transit dataset available from Kaggle. Additionally, two more data sets were added. First, a Synthetic data set comprising two cosines $$3 + \sin\left(4\Pi t + \frac{\Pi}{4}\right) \text{ and } 5\sin\left(10\Pi t + \frac{\Pi}{4}\right)$$

with white noise–N[0,1] added to each sample. Second, a Search data set comprising metrics related to a search engine results page (e.g., click through data)

For each of the above data sets, a large number of observations from different sliding windows (e.g., points 509, 519) were collected on each data set and the energy of the prediction horizon (e.g., right of points 509, 519) was calculated. The Wilcoxon signed-rank test to reject the hypothesis that the energy of the solution computed by k-means is equal to that computed by the disclosed methods. The results of the testing is provided in Table 3 below:

TABLE 4

| Name | τ | ℏ | Fun-k avg (stdev) | k-means avg (stdev) | p-value | Best fit | k |
|---|---|---|---|---|---|---|---|
| Weather | 2y | 2y | 3.76E+8 (5.1E+6) | 4.78E+8 (5.4E+6) | 0.0 | DFT | 3 |
| Smoking | 8y | 2y | 6.3 (0.21) | 8.0 (0.35) | 0.015 | Polyfit | 2 |
| Synthetic | 2t | 1t | 1.657E+3 (55) | 4.79E+3 (101) | 0.0 | DFT | 2 |
| Search | 1m | 1w | 2.435E+4 (537) | 2.438E+4 (539) | 0.001 | DFT | 3 |
| NJ Transit | 3w | 1w | 8.38E+5 (3.56E+5) | 8.62E+5 (3.76E+5) | 0.07 | Sine | 2 |

In the illustrated table, T represents the test window and h represent the prediction window (left and right of 509, 519, respectively). The best fit column indicates the chosen curve fitting algorithm used and k represents the number of centroids. Thus, as illustrated the disclosed methods (Fun-k means) significantly improves clustering in the utilized datasets.

While predictive power is the most important indication that a clustering result is valuable, the main goal of clustering is often to produce insights rather than predict the future. To exemplify the descriptive power of temporal clustering, the disclosed methods were applied to video data. Video can be considered as a three-dimensional data set: X, Y, and grayscale value. In the embodiment illustrated in FIG. 5D, 250 consecutive frames were samples. Both traditional k-means and function centroid approaches were applied to the samples. On average, the energy of the clustering found by the disclosed embodiments means was 96% of the energy of k-means clustering.

Figure 5D:
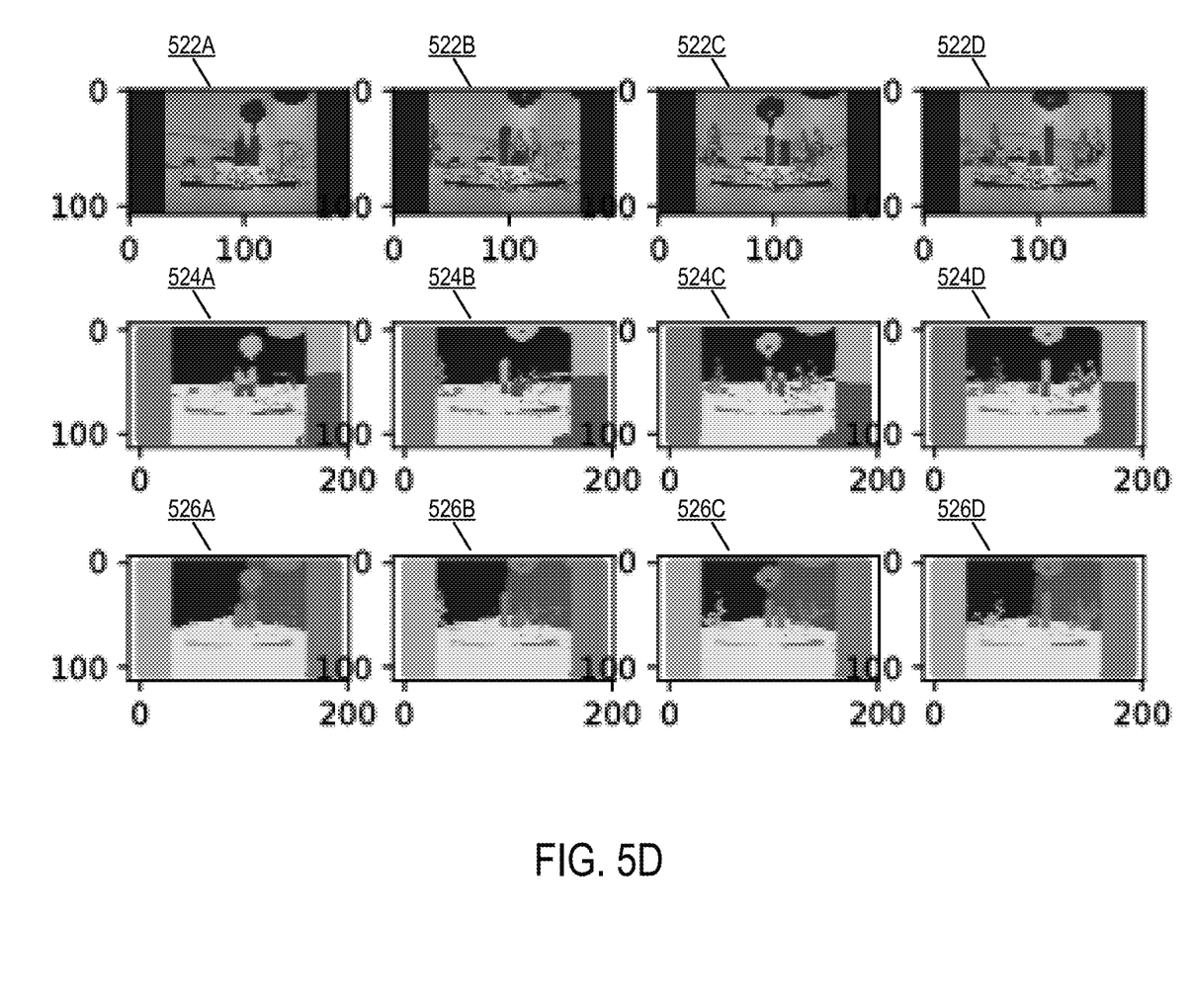
FIG. 5D is a diagram illustrating multiple video frames according to some embodiments of the disclosure.

FIG. 5D depicts a sample of the result of the clustering: on the top row, four frames (522a-522d) are shown from the original video data. The frames (526a-526d) of the bottom raw are the results of k-means clustering. As can be seen, k-means clusters together areas with roughly the same color and takes into account spatial proximity. For instance, the left and right black rails are assigned to different clusters. But the smoke and the smokestack, which are both black, are assigned to the same cluster as the right rail.

The frames (524a-524d) middle row depicts clustering using the disclosed embodiments. In contrast to frames (526a-526d) the clustering using the disclosed embodiments identifies moving parts of the frames: the smoke and the upper part of the smokestack are assigned to their own cluster (the upper side of the right rail is assigned to that cluster as well, based on proximity). Hence, the disclosed embodiments are capable of identifying the temporal feature of the video data.

Figure 6:
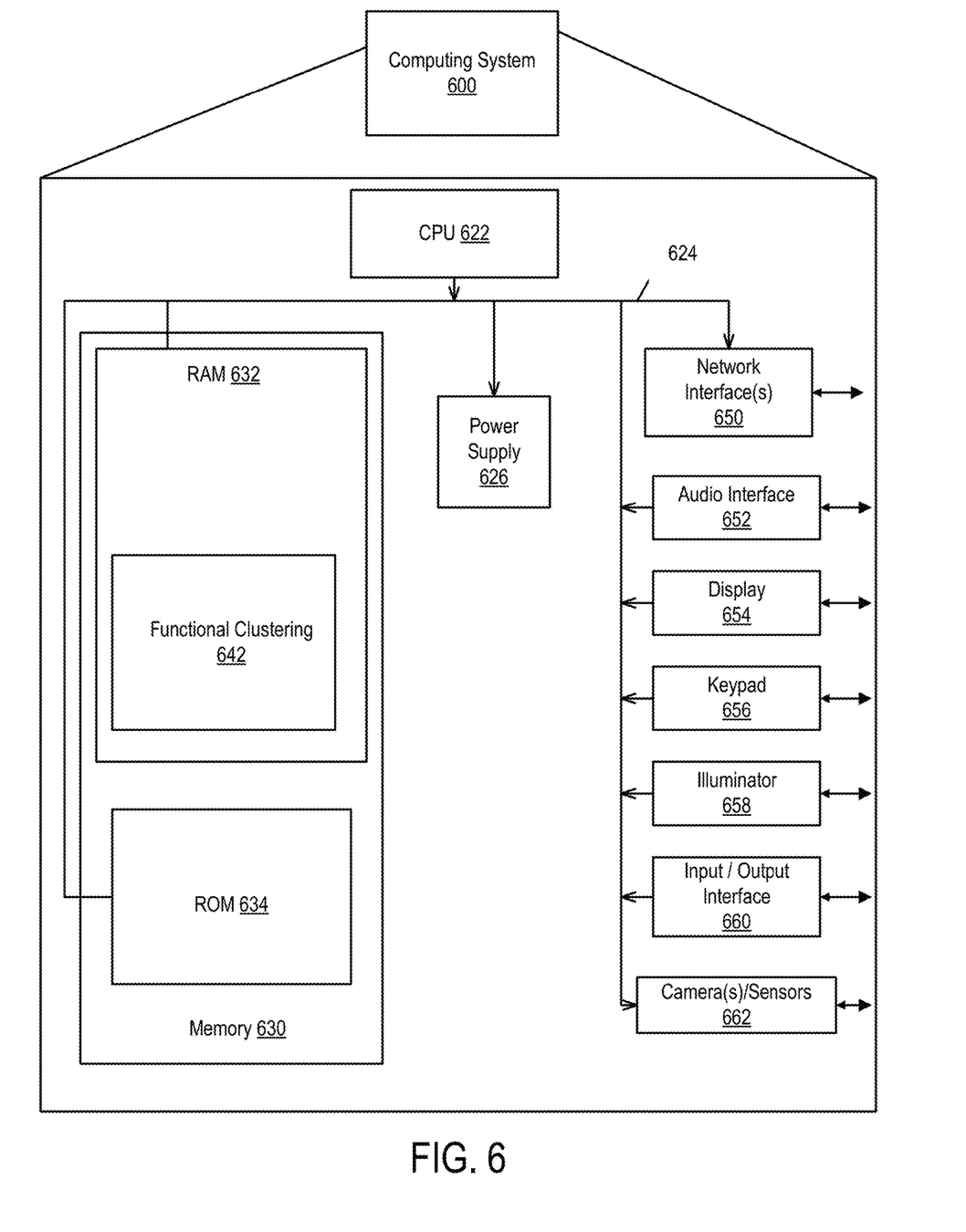
FIG. 6 is a block diagram illustrating a clustering system according to some embodiments of the disclosure.

FIG. 6 is a block diagram illustrating a clustering system according to some embodiments of the disclosure.

System 600 may include many more or less components than those shown in FIG. 6. However, the components shown are sufficient to disclose an illustrative embodiment for implementing the methods described previously.

As shown in FIG. 6, computing system 600 includes a processing unit (CPU) 622 in communication with a mass memory 630 via a bus 624. Computing system 600 also includes a power supply 626, one or more network interfaces 650, an audio interface 652, a display 654, a keypad 656, an illuminator 658, an input/output interface 660, and a camera(s) or other optical, thermal or electromagnetic sensors 662. Computing system 600 can include one camera/sensor 662, or a plurality of cameras/sensors 662, as understood by those of skill in the art.

Power supply 626 provides power to computing system 600. A rechargeable or non-rechargeable battery may be used to provide power. The power may also be provided by an external power source, such as an AC adapter or a powered docking cradle that supplements and/or recharges a battery.

Computing system 600 may optionally communicate with a base station (not shown), or directly with another computing device. Network interface 650 includes circuitry for coupling computing system 600 to one or more networks, and is constructed for use with one or more communication protocols and technologies. Network interface 650 is sometimes known as a transceiver, transceiving device, or network interface card (NIC).

Audio interface 652 is arranged to produce and receive audio signals such as the sound of a human voice. For example, audio interface 652 may be coupled to a speaker and microphone (not shown) to enable telecommunication with others and/or generate an audio acknowledgement for some action. Display 654 may be a liquid crystal display (LCD), gas plasma, light emitting diode (LED), or any other type of display used with a computing device. Display 654 may also include a touch sensitive screen arranged to receive input from an object such as a stylus or a digit from a human hand.

Keypad 656 may comprise any input device arranged to receive input from a user. For example, keypad 656 may include a push button numeric dial, or a keyboard. Keypad 656 may also include command buttons that are associated with selecting and sending images. Illuminator 658 may provide a status indication and/or provide light. Illuminator 658 may remain active for specific periods of time or in response to events. For example, when illuminator 658 is active, it may backlight the buttons on keypad 656 and stay on while the system is powered. Also, illuminator 658 may backlight these buttons in various patterns when particular actions are performed, such as dialing another client device. Illuminator 658 may also cause light sources positioned within a transparent or translucent case of the client device to illuminate in response to actions.

Computing system 600 also comprises input/output interface 660 for communicating with external devices or other input or devices not shown in FIG. 6. Input/output interface 660 can utilize one or more communication technologies, such as USB, infrared, Bluetooth™, or the like.

Mass memory 630 includes a RAM 632, a ROM 634, and other storage means. Mass memory 630 illustrates another example of computer storage media for storage of information such as computer readable instructions, data structures, program modules or other data. Mass memory 630 stores a basic input/output system ("BIOS") 640 for controlling low-level operation of computing system 600. The mass memory also stores an operating system 641 for controlling the operation of computing system 600. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 630 further includes one or more data stores, which can be utilized by computing system 600 to store, among other things, function clustering application 642 and/or other data. For example, data stores may be employed to store information that describes various capabilities of computing system 600. The information may then be provided to another device based on any of a variety of events, including being sent as part of a header during a communication, sent upon request, or the like. At least a portion of the capability information may also be stored on a disk drive or other storage medium (not shown) within computing system 600. Function clustering application 642 may include computer executable instructions which, when executed by computing system 600, enable the function clustering of non-stationary data in accordance with the methods described above.

The present disclosure has been described with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/ acts specified in the block diagrams or operational block or blocks. In some alternate implementations, the functions/ acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:
1. A method comprising:
initializing a plurality of functional centroids, the functional centroids comprising functions, each function in the functions accepting a timestamp as an input and outputting one or more data points based on the timestamp;
partitioning a non-stationary data set, using the functional centroids, into partitions, a number of partitions being equal to the number of functional centroids;

generating a set of fitted functional centroids for each of the partitions;

replacing at least one of the functional centroids with a corresponding fitted functional centroid to obtain final functional centroids if a computed energy of the corresponding fitted functional centroid is less than an energy of the at least one functional centroids;

computing a sum of the energies associated with each of the functional centroids determining that the sum of the energies does not result in a net energy decrease; and outputting the final functional centroids.

2. The method of claim 1, the initializing the plurality of functional centroids comprising:

selecting one or more random points for each of the partitions; and fitting a function based the one or more random points.

3. The method of claim 1, the partitioning the non-stationary data set comprising:

identifying, for each point in the non-stationary data set, a closest functional centroid generating an output value closest to a respective point; and assigning each point to a partition based on the closest functional centroid.

4. The method of claim 1, the generating the set of fitted functional centroids comprising:

fitting a function based on data points associated with a partition;

determining if an energy of the fitted function is less than an energy of a corresponding function centroid; and using the fitted function as the corresponding functional centroid.

5. The method of claim 4, the fitting a function comprising fitting a function using a fitting algorithm selected from the group consisting of a polynomial, single cosine, or nonequispaced fast Fourier transform (NFFT) fitting algorithm.

6. The method of claim 1, an energy of a function computed by summing differences between known points at respective times and outputs of the function for corresponding respective times.

7. The method of claim 1, the determining that the sum of the energies does not result in a net energy decrease comprising:

computing a first energy for the functional centroids prior to generating the set of fitted functional centroids;

computing a second energy for the function centroids after replacing at least one of the functional centroids with a corresponding fitted functional centroid; and determining that the sum of the energies does not result in a net energy decrease if the second energy is not less than the first energy.

8. The method of claim 1, further comprising performing a second partitioning of the non-stationary data set using the functional centroids upon determining that the sum of the energies results in a net energy decrease.

9. A non-transitory computer readable storage medium for tangibly storing computer program instructions capable of being executed by a computer processor, the computer program instructions defining steps of:

initializing a plurality of functional centroids, the functional centroids comprising functions, each function in the functions accepting a timestamp as an input and outputting one or more data points based on the timestamp;

partitioning a non-stationary data set, using the functional centroids, into partitions, a number of partitions being equal to the number of functional centroids;

generating a set of fitted functional centroids for each of the partitions;

replacing at least one of the functional centroids with a corresponding fitted functional centroid to obtain final functional centroids if a computed energy of the corresponding fitted functional centroid is less than an energy of the at least one functional centroid;

computing a sum of the energies associated with each of the functional centroids;

determining that the sum of the energies does not result in a net energy decrease; and outputting the functional centroids.

10. The non-transitory computer readable storage medium of claim 9, the initializing the plurality of functional centroids comprising:

selecting one or more random points for each of the partitions; and fitting a function based the one or more random points.

11. The non-transitory computer readable storage medium of claim 9, the partitioning the non-stationary data set comprising:

identifying, for each point in the non-stationary data set, a closest functional centroid generating an output value closest to a respective point; and assigning each point to a partition based on the closest functional centroid.

12. The non-transitory computer readable storage medium of claim 9, the generating the set of fitted functional centroids comprising:

fitting a function based on data points associated with a partition;

determining if an energy of the fitted function is less than an energy of a corresponding function centroid; and using the fitted function as the corresponding functional centroid.

13. The non-transitory computer readable storage medium of claim 12, the fitting a function comprising fitting a function using a fitting algorithm selected from the group consisting of a polynomial, single cosine, or nonequispaced fast Fourier transform (NFFT) fitting algorithm.

14. The non-transitory computer readable storage medium of claim 9, an energy of a function computing by summing a difference between known points at respective times and an output of the function for corresponding respective times.

15. The non-transitory computer readable storage medium of claim 9, the determining that the sum of the energies does not result in a net energy decrease comprising:

computing a first energy for the functional centroids prior to generating the set of fitted functional centroids;

computing a second energy for the function centroids after replacing at least one of the functional centroids with a corresponding fitted functional centroid; and determining that the sum of the energies does not result in a net energy decrease if the second energy is not less than the first energy.

16. The non-transitory computer readable storage medium of claim 9, the computer program instructions further defining the step of performing a second partitioning of the non-stationary data set using the functional centroids upon determining that the sum of the energies results in a net energy decrease.

17. An apparatus comprising:

a processor;

a storage medium for tangibly storing thereon program logic for execution by the processor, the stored program logic comprising:

logic, executed by the processor, for initializing a plurality of functional centroids, the functional centroids comprising functions, each function in the functions accepting a timestamp as an input and outputting one or more data points based on the timestamp;

logic, executed by the processor, for partitioning a non-stationary data set, using the functional centroids, into partitions, a number of partitions being equal to the number of functional centroids;

logic, executed by the processor, for generating a set of fitted functional centroids for each of the partitions;

logic, executed by the processor, for replacing at least one of the functional centroids with a corresponding fitted functional centroid to obtain final functional centroids if a computed energy of the corresponding fitted functional centroid is less than an energy of the at least one functional centroid;

logic, executed by the processor, for computing a sum of the energies associated with each of the functional centroids;

logic, executed by the processor, for determining that the sum of the energies does not result in a net energy decrease; and logic, executed by the processor, for outputting the functional centroids.

18. The apparatus of claim 17, the logic for initializing the plurality of functional centroids comprising:

logic, executed by the processor, for selecting one or more random points for each of the partitions; and logic, executed by the processor, for fitting a function based the one or more random points.

19. The apparatus of claim 17, the logic for partitioning the non-stationary data set comprising:

logic, executed by the processor, for identifying, for each point in the non-stationary data set, a closest functional centroid generating an output value closest to a respective point; and logic, executed by the processor, for assigning each point to a partition based on the closest functional centroid.

20. The apparatus of claim 17, the logic for generating the set of fitted functional centroids comprising:

logic, executed by the processor, for fitting a function based on data points associated with a partition;

logic, executed by the processor, for determining if an energy of the fitted function is less than an energy of a corresponding function centroid; and logic, executed by the processor, for using the fitted function as the corresponding functional centroid.

21. The apparatus of claim 17, the logic for computing an energy of a function comprising logic, executed by the processor, for summing a difference between known points at respective times and an output of the function for corresponding respective times.

22. The apparatus of claim 17, the logic for determining that the sum of the energies does not result in a net energy decrease comprising:

logic, executed by the processor, for computing a first energy for the functional centroids prior to generating the set of fitted functional centroids;

logic, executed by the processor, for computing a second energy for the function centroids after replacing at least one of the functional centroids with a corresponding fitted functional centroid; and logic, executed by the processor, for determining that the sum of the energies does not result in a net energy decrease if the second energy is not less than the first energy.

23. The apparatus of claim 17, the stored program logic further comprising logic, executed by the processor, for performing a second partitioning of the non-stationary data set using the functional centroids upon determining that the sum of the energies results in a net energy decrease.

* * * * *